United States Patent [19]
Chen et al.

[11] Patent Number: 5,907,351
[45] Date of Patent: May 25, 1999

[54] METHOD AND APPARATUS FOR CROSS-MODAL PREDICTIVE CODING FOR TALKING HEAD SEQUENCES

[75] Inventors: Tsuhan Chen, Middletown, N.J.; Ram R. Rao, Atlanta, Ga.

[73] Assignee: Lucent Technologies Inc., Murray Hill, N.J.

[21] Appl. No.: 08/547,213

[22] Filed: Oct. 24, 1995

[51] Int. Cl.[6] .................................................. H04N 7/14
[52] U.S. Cl. .............................. 348/14; 348/17; 348/515; 395/2.44; 395/279
[58] Field of Search ................................ 348/515, 14, 15, 348/16, 17, 18, 19, 20, 13, 12, 7, 10, 11; 455/5.1, 4.2, 6.2, 6.3; 395/2.69, 2.44, 2.79, 2.81, 2.67, 2.85; 382/118; 379/53, 54; H04N 7/14, 7/15

[56] References Cited

U.S. PATENT DOCUMENTS

| | | | |
|---|---|---|---|
| 5,426,460 | 6/1995 | Erving et al. | 348/14 |
| 5,500,673 | 3/1996 | Zhou | 348/156 |
| 5,608,839 | 3/1997 | Chen | 395/2.44 |
| 5,621,858 | 4/1997 | Stork et al. | 395/2.41 |

OTHER PUBLICATIONS

Lavagetto, "Converting Speech into Lip Movements: A Multimedia Telephone for Hard of Hearing People", IEEE Transactions on Rehabilitation Engineering, Vol. 3, No. 1, Mar. 1995, pp. 90–102.

Morishima et al., "An Intelligent Facial Image Coding Driven by Speech and Phoneme", I.C.A.S.S.P. '89, pp. 1795–1798.

Chen, et al., "Speech–Assisted Video Processing: Interpolation and Low–Birate Coding", 28th Asilomar Conference, Pacific Grove, Oct. 1994.

Rao et al. "On Merging Hidden Markov Models With Deformable Templates", I.C.I.P. '95 Washington, D.C. Oct. 1995.

Primary Examiner—Christopher C. Grant

[57] ABSTRACT

A method and apparatus for transmitting and remotely displaying the audio and visual portion of a person speaking so that the audio and visual signals are synchronized. The audio signal is constantly transmitted to the receiver and is also used to create a predicted image of the lips of the talking head. The actual lip image is compared to the predicted lip image. Based upon this comparison, it is determined which of three signals is to be transmitted to the receiver: no signal corresponding to the video signal, a signal corresponding only to the differences between the actual lip image and a predicted lip image, or the actual lip image. The receiver reconstructs a lip image based upon the audio signal received and the signal received, if any, corresponding to the video image and inserts it into the previously received video frame or modifies the previous frame accordingly.

37 Claims, 5 Drawing Sheets

METHOD AND APPARATUS FOR CROSS-MODAL PREDICTIVE CODING FOR TALKING HEAD SEQUENCES

FIELD OF THE INVENTION

The present invention relates to a method and apparatus for transmitting a video image of a person's lips in synchronization with the person's speech.

BACKGROUND OF THE INVENTION

In video telephony, teleconferencing and multimedia applications, due to limited bandwidth or storage space, a video coder typically cannot encode all incoming video frames because the transmission of each video frame requires a very substantial number of bits to be transmitted. Instead, the video coder typically drops some frames by subsampling the video at a fraction of the normal rate and encodes only at the low frame rate, which can be as low as one to two frames per second for some applications. This subsampling technique, known as frame skipping, results in a jerky motion of the images in the video signal and a loss of synchronization between the video and audio signals. Additionally, because a typical speaking person can enunciate more than ten sounds per second, the positions of the lips, jaws, teeth and tongue change at high rates. Consequently, during human speech, at sampling rates of only one to two frames per second, most mouth movement is lost in the video signal when frame skipping is employed. Thus, during teleconferencing, for example, lip movements of a speaking person (a talking head) typically do not match the words actually spoken.

Studies of human speech perception have demonstrated that human perception of acoustic speech can be affected by the visual cues of lip movements. For example, if a video shows a speaker's mouth saying "ga" but the audio is dubbed with the sound "ba", a viewer/listener frequently understands "da", a completely different message. Similarly, a visual "ga" combined with an audio "pa" is often perceived as "ta", and a visual "da" combined with an audio "ma" is often perceived as "na". This confusion is known as the "McGurk Effect". Thus, it is clear that lip reading is used, to some extent, by most people, even those who are not hearing impaired, to clarify their audio perception, especially when background noise levels are high. Lip reading obviously cannot be used by a listener if the audio speech does not match with the video picture of the speaking person. It is thus clear that synchronization of bimodal speech, video and audio signals, is an important goal in human perception of speech.

Although various techniques, such as linear interpolation and motion-adaptive interpolation, have been used to smooth out the jerkiness of images that are generated in the frame skipping technique typically used in video conferencing, these techniques are unable to reproduce mouth movements. Consequently, these methods do not aid in the human perception of a teleconferencing signal.

Techniques have been developed to create an animated video representation of human lips on a face based upon an audio speech signal. See, for example, Lavagetto, "Converting Speech into Lip Movements: A Multimedia Telephone for Hard of Hearing People", IEEE Transactions On Rehabilitation Engineering, Vol. 3, No. 1, March 1995, pp. 90–102; Morishima et al., "An Intelligent Facial Image Coding Driven by Speech and Phoneme", I.C.A.S.S.P. '89, pp. 1795–8; Chen, et al., "Speech-Assisted Video Processing: Interpolation and Low-Bitrate Coding", 28th Asilomar Conference, Pacific Grove, October 1994; and AT&T U.S. patent application Ser. No. 08/210,529. Methods have also been developed to isolate a human face from a background video picture and then to locate the lips on the face. See, for example, Rao et al., "On Merging Hidden Markov Models With Deformable Templates", I.C.I.P. '95, October 1995. These references, the disclosures of which are incorporated herein by reference, do not disclose or suggest a method or apparatus for transmitting a video signal in real-time synchronization with an audio signal to display a human speaker's lips without any frame skipping in the video signal.

SUMMARY OF THE INVENTION

The present invention is directed to a method and apparatus for transmitting and remotely displaying the audio and visual portion of a person speaking so that the audio and visual signals are synchronized while at the same time also minimizing the amount of information that must be transmitted from the transmitter to the receiver. In accordance with the present invention, the audio signal is constantly transmitted to the receiver and is also used to create or encode a predicted image of the lips of the person speaking, the talking head. Such use of the audio, a first mode of the communication, to generate or encode a visual image, a second mode of the communication, is referred to as cross-modal or bi-modal encoding.

The visual image of the talking head is analyzed to isolate the lips, and this actual lip image is then encoded. At the same time that the visual image is being analyzed, the audio speech is analyzed to break it into its spoken language components or phonemes. Since it is known that language components are associated with particular lip shapes, the audio speech can be used to generate a predicted image of the talking head's lips. The actual lip image and the predicted lip image are then compared and a signal corresponding to the differences between the two images is generated.

In accordance with a first embodiment of the present invention, a Cost Function is then used to determine what signal, if any, corresponding to the video image is to be transmitted to the receiver. The Cost Function takes into account a number of factors that are considered important in data transmission, such as a transmission bit rate and video image distortion. A Cost value is determined for three possible data transmission scenarios. For the first scenario, a Cost value is determined for the transmission of no video signal but instead permitting the receiver to reconstruct a lip shape based solely upon the audio signal. For the second scenario, a Cost value is determined for the transmission of a signal corresponding to differences between a predicted lip image and the actual lip image. For the third scenario, a Cost value is determined for the transmission of the actual video picture. The signal that is transmitted to the receiver corresponds to the one that generates the lowest Cost value.

In another embodiment of the present invention, a numerical value corresponding to the differences between the actual lip shape and the predicted lip shape is determined to assess how accurate the prediction is. If the two lip images are substantially the same, the differences are less than a predetermined low threshold value, then no information other than the audio speech is transmitted to the receiver. If the two images are similar to one another but there are some relatively minor differences, the differences are greater than the lower threshold value but less than a higher threshold value, then only a signal representative of the differences is transmitted to the receiver. If the two images are substantially different from one another, the differences are greater than the higher threshold value, then the actual video signal is transmitted to the receiver.

For both of the embodiments discussed above, in the first two scenarios, the number of information bits that must be transmitted to the receiver is reduced in comparison with the bits required to transmit an entire image. Furthermore, since a video image need only be transmitted as needed, on average the image transmitting technique of the present invention requires a much lower transmission bit-rate than required in conventional teleconferencing methods. Consequently, frame skipping and thus motion smoothing techniques are rendered unnecessary, and a real-time image of the talking head with its lips synchronized with the sound is obtained, enhancing a viewer's ability to fully understand the speech being transmitted.

Although the present invention has been described with reference to teleconferencing, the present invention can also be employed in any video processing which might benefit from audio synchronization with minimal bit transmission. For example, in feature film production, dialog is often added after filming has been completed when background noise existing during filming partially obscures the dialog. The cross-modal coding of the present invention can be used in such post-production dubbing to ensure precise synchronization, especially if it is necessary to change the dialog during post-production.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements.

DETAILED DESCRIPTION OF THE PRESENTLY PREFERRED EMBODIMENTS

Figure 1:
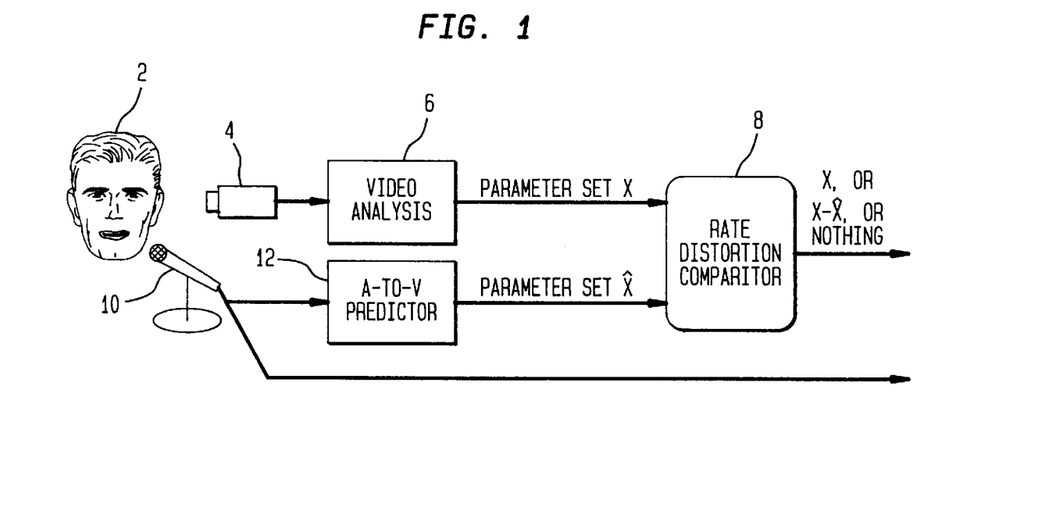
FIG. 1 is a block diagram of an apparatus suitable for implementing the transmitting portion of the cross-modal predictive coding method of the present invention.

Referring to FIG. 1 in which is shown a simplified block diagram of an apparatus suitable for implementing the transmitting portion of the cross-modal predictive coding method of the present invention, the visual image of a speaking person or talking head 2 is taken by a camera 4 and is transmitted as an electrical signal, one video frame at a time, to a video analysis module 6. For each frame of the video signal, the video analysis module 6 determines the position of the lips of the talking head 2 and electronically separates the speaker's lips from the remainder of the frame. The video analysis module 6 then determines the shape of the speaker's lips and then encodes a signal, shown as Parameter set X, corresponding to the actual shape of the speaker's lips.

Figure 2:
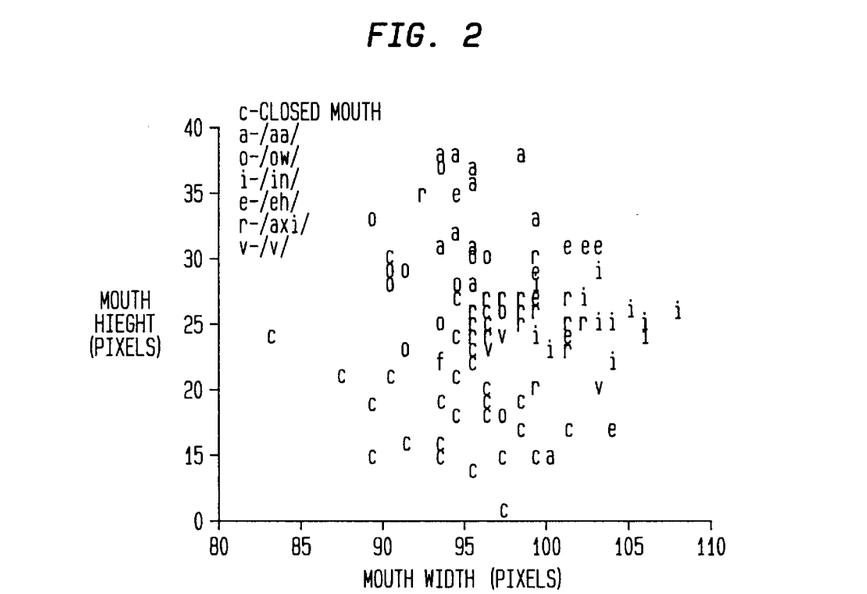
FIG. 2 is a graph depicting mouth shapes, height and width, for a number of representative spoken language components.

At the same time that the video signal is being analyzed by the video analysis module 6, a microphone 10 transmits the spoken words of the talking head 2 electronically to an audio-to-video predictor module 12 and to a remotely located receiver (not shown). If necessary, the audio signal transmitted from the microphone 10 to the receiver is appropriately delayed so that it can be synchronized with the video signal which is generated separately as discussed below. The audio-to-video predictor module 12 filters the audio signal to remove background noise and then analyzes the speech to break it into its spoken language components or phonemes. The audio-to-video predictor module 12 also has stored in its memory, or can access the memory of an associated memory module in which is stored, a list of all possible phonemes and the corresponding human lip shape for each language component. As shown in FIG. 2, the mouth shape of a person can be predicted or approximated if the phoneme spoken has first been determined. FIG. 2, which shows mouth shapes for a number of representative phonemes spoken by a test subject, demonstrates each phoneme results in a particular lip shape: all of the /axr/ sounds are clustered in the middle of FIG. 2, all of the /aa/ sounds are clustered in the upper middle of FIG. 2, all of the /ih/ sounds are clustered in the right portion of FIG. 2, and all of the closed mouth sounds, /p/, /b/, and /m/, are clustered in the lower left of FIG. 2. The sound abbreviations used above are the ARPABET representations for the sounds. Thus, if a spoken phoneme is known, the mouth shape that occurs when that phoneme is spoken by a person can be predicted. Returning to FIG. 1, the audio-to-video predictor module 12 then determines the lip shape that corresponds to the language component detected and encodes this lip shape, denoted as Parameter set $\hat{X}$.

A rate distortion comparator 8 then compares the encoded signal X corresponding to the actual shape of the lips derived from the video signal to the encoded signal $\hat{X}$ corresponding to the predicted shape of the lips derived from the audio signal. The rate distortion comparator 8 then determines what signal (the actual video signal, the difference between the actual video signal and the predicted video signal, or no signal) is to be transmitted to the receiver in addition to the audio signal so that the receiver can display a video picture of the talking head with its lip movements synchronized with the sound, as discussed in detail below with reference to FIGS. 3A, 3B and 3C.

Figure 3A:
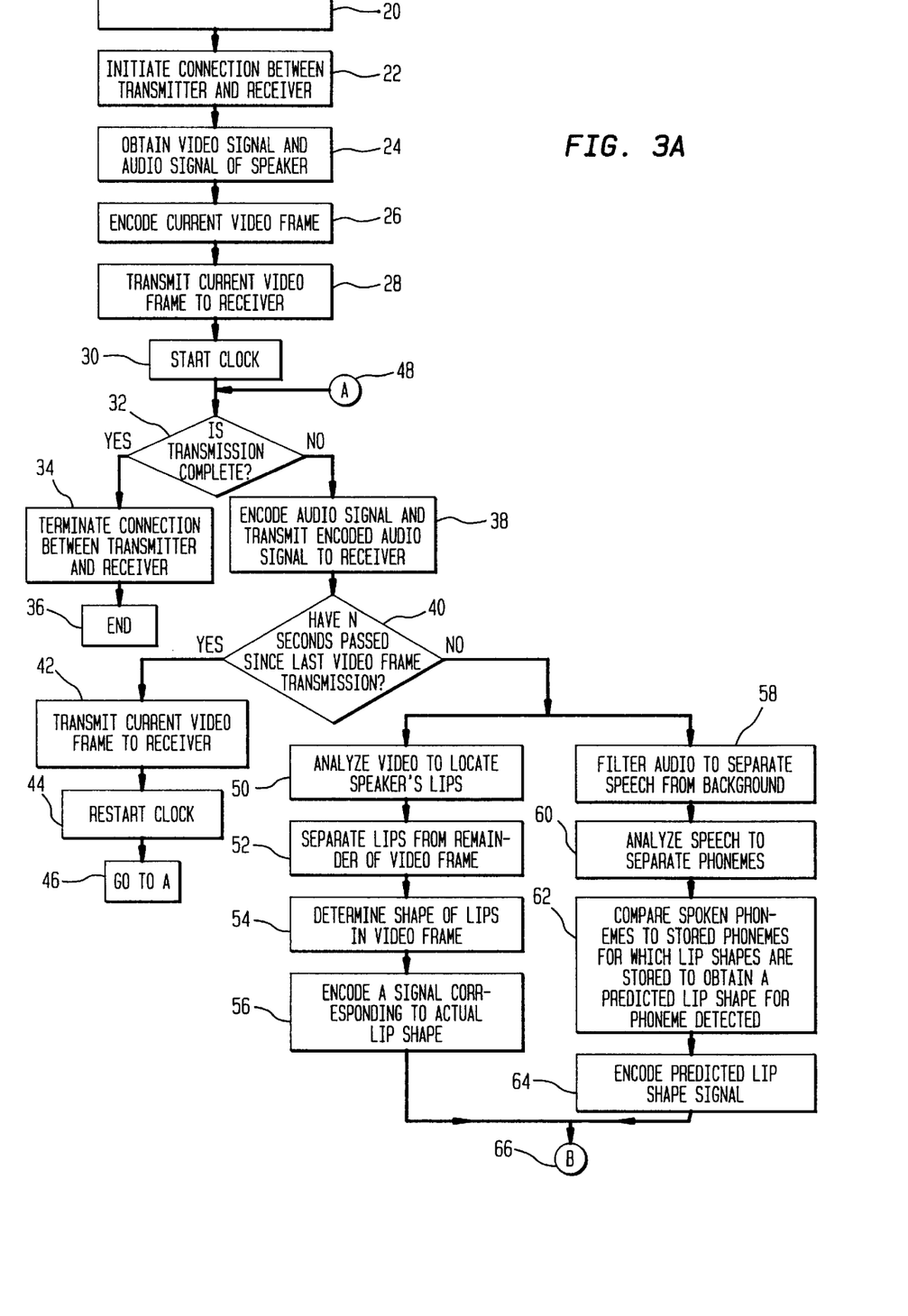
FIGS. 3A and 3B together depict a flow chart for a first embodiment and FIGS. 3A and 3C together depict a flow chart for a second embodiment of the cross-modal predictive coding method of the present invention.
Figure 3B:
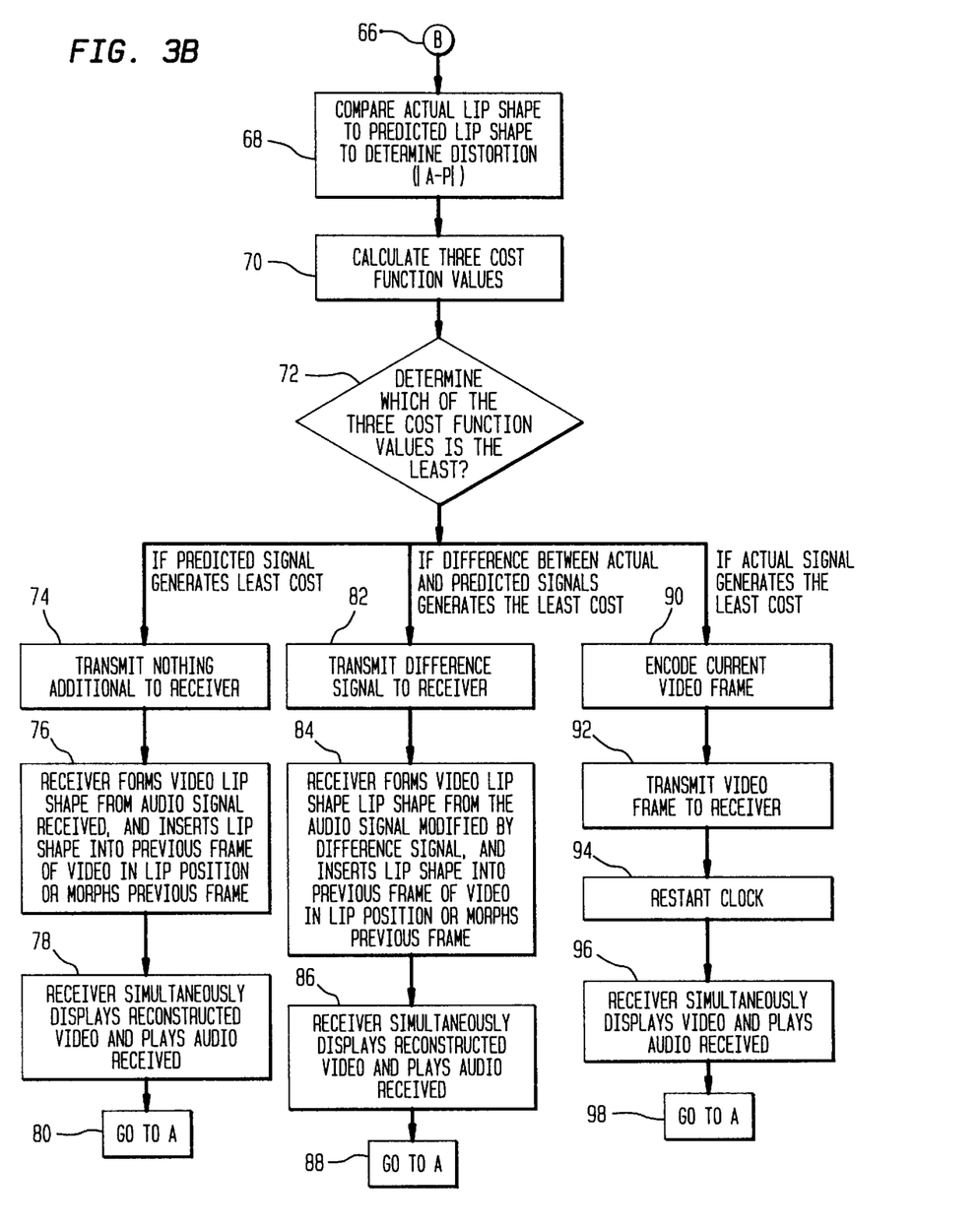

Referring now to the flow diagram shown in FIG. 3A and continued on FIG. 3B in which is shown a first embodiment of the cross-modal predictive coding method of the present invention, during the initialization step 20 (shown in FIG. 3A), the system becomes acquainted with the talking person's speech. Typically, this is accomplished by having the person speak a few sentences or by reading a short prepared script. The system then learns how the person enunciates various language components so that it will be able to predict lip shapes based solely upon the person's voice. The connection between the transmitter and the receiver is then made in step 22 by, for example, dialing the appropriate teleconferencing telephone number. A video and audio signal of the speaker is obtained by activating a video camera and a microphone, as indicated in step 24. The current frame of the video signal is then encoded, step 26, and transmitted to the receiver, step 28, and an internal clock is started, step 30. It is then determined, step 32, whether the transmission is complete. Obviously, this can be done, for example, by checking whether the users have indicated to the system that the teleconference has been completed, such as by pushing a disconnect button. If the teleconference has been completed, the connection between the transmitter and the receiver is terminated, step 34, and use of the system ends, step 36.

Returning to step 32, if the teleconference has not been completed, the audio signal is encoded and transmitted to the receiver, step 38. The clock is then checked, step 40, to determine if a predetermined period of time, N seconds, has elapsed since the last time that a video frame was transmitted to the receiver. This period of time, N, may be either more or less than one second, and may be selected by the users or may be preset.

If the period of time, N, has elapsed since the last video frame transmission to the receiver, then the current video frame is transmitted to the receiver, step 42, and the clock is reset, step 44, and it is again determined if the transmission is complete, steps 46, 48 and 32. Although the embodiment of the present invention shown in FIG. 3A allows the receiver's video picture to be refreshed with an actual image at least once every N seconds, alternatively the receiver's image may be refreshed only when the predicted lip shape signal $\hat{X}$ is substantially different from the actual lip shape signal X (case three and steps 90, 92 and 94 discussed below). In this embodiment, steps 30, 40, 42, 44, 46 and 94 would be eliminated.

Returning to step 40, if the period of time, N, has not yet elapsed since the last video frame transmission to the receiver, then the video signal is analyzed and processed, steps 50, 52, 54 and 56, and, at the same time, the audio signal is analyzed and processed, steps 58, 60, 62 and 64. During the analysis and processing of the video signal, the video frame is first analyzed to determine the location of the speaker's lips, step 50. The portion of the frame containing the lips is then separated from the remainder of the frame, step 52, the shape of the lips is determined, step 54, and the lip shape is encoded, step 56. Simultaneously, the audio signal is analyzed and processed to remove background noise from the speech, step 58, and the speech is analyzed to separate it into its phonemes, step 60. A predicted lip shape is then selected for each spoken phoneme by comparing the actual spoken phoneme to a list of phonemes stored in memory, each of which phonemes being associated with a predicted lip shape, step 62. This list, or look-up table, has information similar to that shown in FIG. 2 but more comprehensive. The predicted lip shape is then encoded, step 64. At this point, the flow chart shown in FIG. 3A continues to FIG. 3B, step 66.

In step 68, the actual lip shape determined in step 56 from the video signal is compared to the predicted lip shape determined in step 64 from the audio signal. If the actual lip shape of the talking head is denoted as A and the lip shape predicted or determined based upon the audio signal is denoted as P, then the amount of distortion in the video picture between the actual lip shape of the talking head and the lip shape displayed at the receiving end may be denoted as $|A-P|$.

In step 70, a Cost Function is employed to determine Cost values for three possible transmission scenarios. The Cost Function is used to determine which one of these three transmission scenarios should be employed. The following cost function, C, which takes into account the transmission bit-rate and the image distortion, may be employed:

$$C=R+(w \times D) \quad (I)$$

where R is the transmission bit-rate, D is the distortion in the video picture between the actual lip shape of the talking head and the lip shape displayed at the receiver, and w is a user selectable parameter. A high value of w is selected if small distortion is considered more important than a low bit-rate, and a low value of w is selected if a low bit-rate is considered more important than high distortion.

In the first transmission scenario, no signal corresponding to the video signal is transmitted to the receiver. In this case, the receiver reconstructs a predicted lip shape based solely upon the audio signal received and inserts the reconstructed lip shape into the previous video frame of the talking head (or appropriately morphs the previous frame), as discussed below with respect to steps 74, 76 and 78. Although it is preferable not to transmit any signal, thereby reducing the amount of information to be transmitted, alternatively a signal may be transmitted to the receiver to indicate that no video signal of any kind is being sent. The number of bits, R, required to be transmitted to the receiver as part of communicating the video signal is 0. The distortion, D, will be the difference between the actual lip shape of the talking head and the predicted lip shape, $|A-P|$. Thus, the Cost for this first transmission scenario is:

$$C_1=0+(w \times |A-P|)=w \times |A-P| \quad (II)$$

In the second transmission scenario, a signal corresponding to the differences between the actual lip shape, X, and the predicted lip shape, $\hat{X}$, are transmitted to the receiver. In addition, a signal may be transmitted to the receiver to indicate the difference video signal is being sent and that appropriate processing will have to be performed. In this case, the receiver reconstructs a predicted lip shape based upon the audio signal received modified by the received difference signal, $X-\hat{X}$, and inserts the reconstructed lip shape into the previous video frame of the talking head, as discussed below with respect to steps 82, 84 and 86. The number of bits required to be transmitted to the receiver as part of communicating the difference signal is $B_1$, and the distortion is approximately 0 because the reconstructed lip shape displayed at the receiver is substantially identical to the actual image. The Cost for this second transmission scenario is:

$$C_2=B_1+(w \times 0)=B_1 \quad (III)$$

In the third transmission scenario, the encoded actual video signal X is transmitted to the receiver along with the audio signal and the number of bits required to be transmitted to the receiver as part of communicating the video signal is $B_0$. In this case, the amount of distortion in the video picture between the actual lip shape of the talking head and the lip shape displayed at the receiving end will be 0. The Cost for this third transmission scenario is:

$$C_3=B_0+(w \times 0)=B_0 \quad (IV)$$

Since an entire video signal is transmitted for the third transmission scenario, while only a difference signal is transmitted for the second case, it will be seen that $B_0$ will typically be greater than $B_1$.

Returning to FIG. 3B, in step 72, the Cost function values for the three transmission scenarios are compared. If the predicted signal generates the lowest Cost value, $C_1$, then no additional signals are transmitted to the receiver, step 74, other than the audio signal which is already being transmitted to the receiver, step 38. Alternatively a signal may be transmitted to the receiver to indicate that no video signal of any kind is being sent. The receiver then reconstructs a predicted lip shape, step 76, based entirely upon the audio signal received, by analyzing the audio signal, separating it into its phonemes and selecting an appropriate lip shape based upon a list of phonemes stored in memory, each of which being associated with a predicted lip shape, in the same way that a lip shape is determined in steps 60 and 62, discussed in detail above. The previous video frame is then analyzed to locate the mouth, and the reconstructed lip shape is inserted into the proper position. Alternatively, the lip shape in the previous frame is modified or morphed to assume the predicted lip shape determined to reflect the audio signal received. The modified video frame is then displayed, incorporating the new lip shape, and simultaneously, the audio signal is played, step 78. The transmitter simultaneously resumes processing its input audio and video signals, steps 80 and 48.

Returning to step 72, if the difference signal generates the lowest Cost value, $C_2$, then the difference signal, $X-\hat{X}$, is transmitted to the receiver, step 82. In addition, the receiver may receive a signal to indicate the difference video signal is being sent and that appropriate processing will have to be performed. The receiver then reconstructs a lip shape based upon the audio signal (as discussed above with reference to step 76), but appropriately modified by the difference signal, step 84. The previous video frame is then analyzed to locate the mouth, and the reconstructed lip shape is inserted into the proper position, or the lip shape in the previous frame is appropriately morphed. The modified video frame is then displayed, incorporating the new lip shape, and simultaneously, the audio signal is played, step 86. The transmitter simultaneously resumes processing its input audio and video signals, steps 88 and 48.

Returning to step 72, if the actual video signal generates the lowest Cost value, $C_3$, then the current video frame is encoded, step 90, and transmitted to the receiver, step 92. The clock is restarted, step 94, to ensure that an actual video frame is transmitted no more frequently than necessary but at least every N seconds, and the receiver simultaneously displays the current video frame and the audio signal, step 96. The transmitter simultaneously resumes processing its input audio and video signals, steps 98 and 48.

Figure 3C:
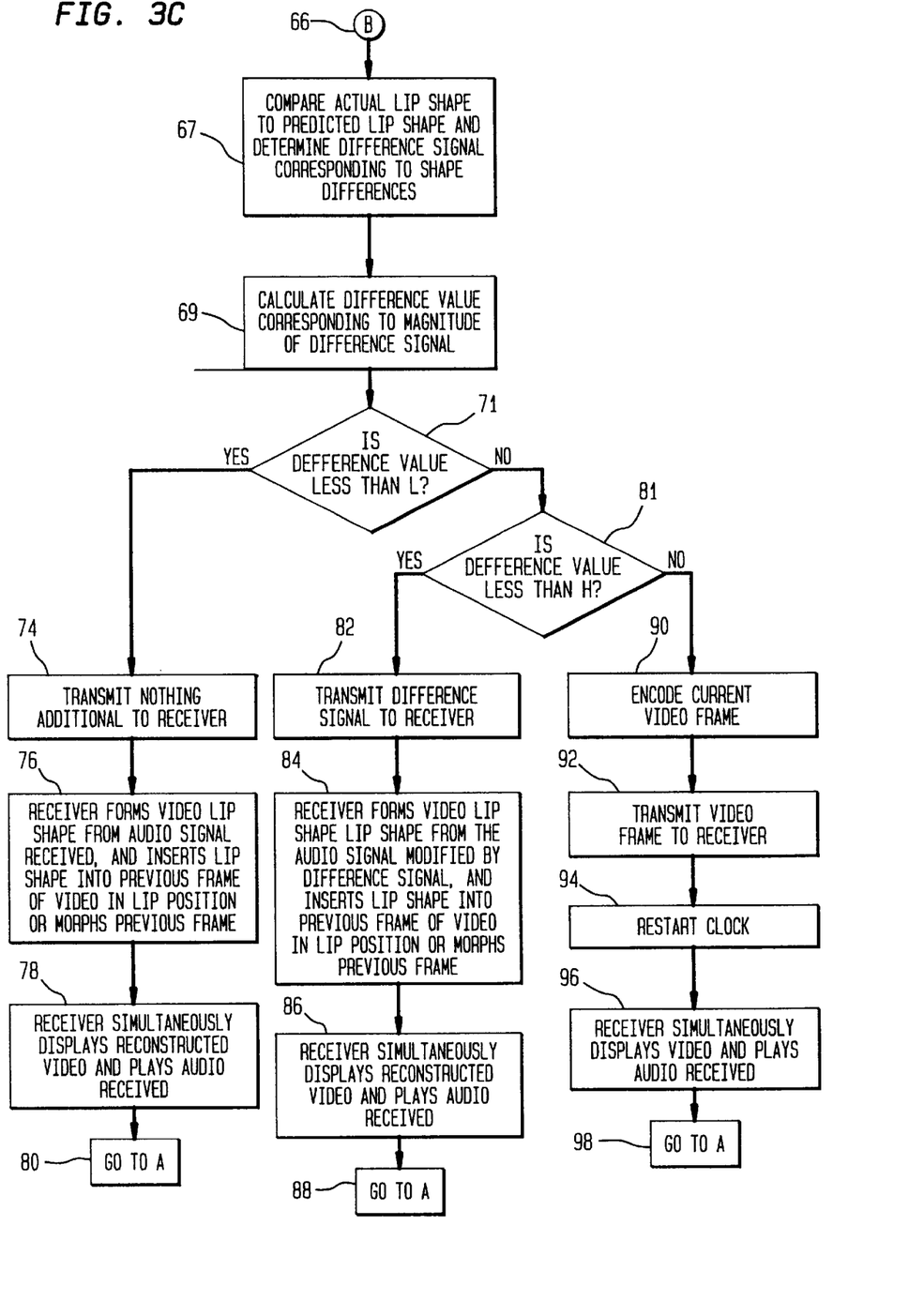

In an alternate embodiment of the present invention shown in FIG. 3A and continued in FIG. 3C, a value corresponding to the differences between the actual lip shape and the predicted lip shape is determined and is compared to two thresholds to select the appropriate transmission scenario. The process steps shown in FIG. 3A are followed for this embodiment and are continued at step 66 in FIG. 3C. In step 67, the actual lip shape and the predicted lip shape are compared, and a difference signal corresponding to the differences in the two signals is determined, $X-\hat{X}$. A numeral magnitude of this difference signal is then determined, step 69. It is then determined whether the magnitude of the difference signal is less than a predetermined lower threshold value, L, step 71.

If the magnitude of the difference signal is less than the lower threshold value, L, indicating that the predicted lip shape is substantially the same as the actual lip shape, then no additional signals are transmitted to the receiver, step 74, and the receiver generates a signal based solely upon the audio signal received, as discussed above with respect to steps 76, 78 and 80.

Returning to step 71, if the magnitude of the difference signal is not less than the lower threshold value, L, indicating that the predicted lip shape is not substantially the same as the actual lip shape, then it is determined if the predicted lip shape is similar to the actual lip shape or completely different therefrom, step 81. If there are only relatively minor differences between the actual lip shape and the predicted lip shape (i.e., the magnitude of the difference signal is greater than the lower threshold value, L, but less than the higher threshold value, H), then the difference signal, $X-\hat{X}$, is transmitted to the receiver, step 82, and the receiver generates a signal based upon the audio signal received modified by the differences signal, as discussed above with respect to steps 82, 84, 86 and 88.

Returning to step 81, if there are substantial differences between the actual lip shape and the predicted lip shape (i.e., the magnitude of the difference signal is greater than the higher threshold value, H), then the current video frame is transmitted to the receiver, as discussed above with respect to steps 90, 92, 94, 96 and 98.

The values of the lower and higher thresholds, L and H, thus determine what signals are transmitted to the receiver, and hence how many bits are transmitted and the extent of distortion in the video picture at the receiver. As the values of the thresholds, L and H, are increased, the dynamic transmission bit-rate can be expected to decrease; however, the amount of distortion at the receiver can also be expected to increase. Conversely, as the values of the thresholds, L and H, are decreased, the dynamic transmission bit-rate can be expected to increase and the amount of distortion at the receiver can be expected to decrease. The values for the two thresholds may be preprogrammed, selected by the users, or determined heuristically, i.e., by the transmitter or receiver based upon various factors including, for example, a transmission bit rate and a video image distortion.

Figure 4:
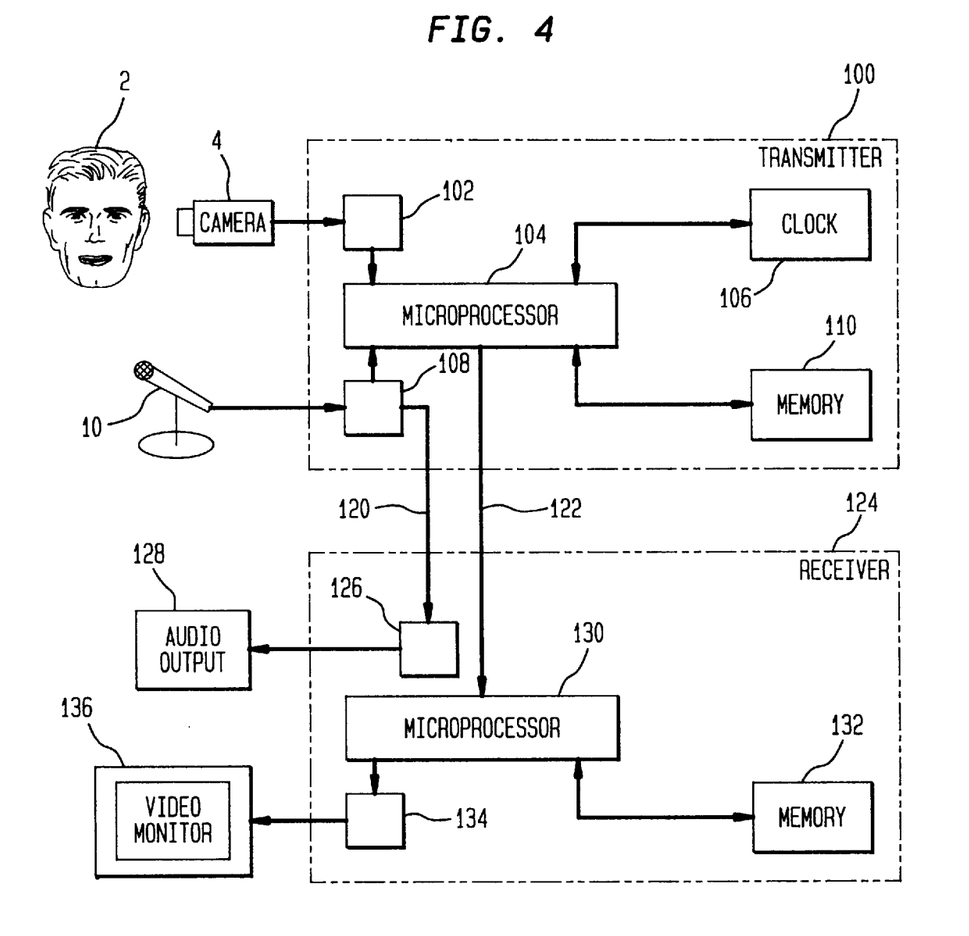
FIG. 4 is a simplified block diagram of an apparatus suitable for processing, transmitting and receiving information according to the cross-modal predictive coding method of the present invention.

Referring now to FIG. 4, which shows a simplified block diagram of an apparatus suitable for processing, transmitting and receiving information according to the cross-modal predictive coding method of the present invention, a camera 4 obtains a video picture of the speech of a talking head 2. The video signal generated by the camera 4 is transmitted to a transmitter 100. Simultaneously, a microphone 10 obtains the audio of the speech of the talking head 2. The audio signal generated by the microphone 10 is transmitted to the transmitter 100.

Within the transmitter, initial processing of the video signal is performed by a video processing module 102 where the signal is amplified, filtered and encoded into computer readable form. Similarly, initial processing of the audio signal is performed by an audio processing module 108 where the signal is amplified, filtered and encoded into computer readable form. The signals from the two processing modules 102, 108 is then fed to a transmitter microprocessor 104 where the signal processing steps described with reference to FIGS. 1, 3A, 3B and 3C are performed. The microprocessor 104 may be any type of data processing unit, from a number of semiconductor chips, having a specific program intended solely to implement the teleconferencing method of the present invention, to a general purpose computer. The microprocessor 104 is also optionally interactively connected to a clock 106 if it is desired to ensure that an actual video frame is periodically transmitted to the receiver 124. Within the memory module 110, which is also interactively connected to the microprocessor 104, is stored various programming steps, and the look-up table containing lip shapes as a function of phoneme. The memory module 110 is also used to temporarily store various processing data that is generated.

After the audio and video signals have been analyzed and processed by the microprocessor 104 of the transmitter 100, the video signal is transmitted over line 122 to the receiver 124. Additionally, since the audio portion of the speech is always being transmitted during a teleconference, audio processing module 108 transmits its output through line 120 to receiver 124. Although lines 120 and 122 are shown in FIG. 4 conceptually as being two separate lines, in the actual implementation of the present invention the two lines 120, 122 would constitute a single line with the two signals being transmitted simultaneously, such as by frequency- and/or time-division multiplexing. Of course, the two communication lines 120, 122 may have any length and may constitute any kind of telecommunication connection, including, for example, electric wires, fiber-optic cables, microwave connections, laser connections or any combination of one or more of these.

The audio signal received by the receiver 124 over line 120 is processed by an audio processing module 126 and is fed to an audio output device 128 such as a speaker.

The video signal received by the receiver 124 over line 122 is fed to receiver microprocessor 130 where the video signal is processed and reconstructed, as appropriate, as discussed with reference to FIGS. 1, 3A, 3B and 3C. Within memory module 132, which is interactively connected to the microprocessor 130, is stored, various programming steps, and the look-up table containing lip shapes as a function of phoneme. The memory module 132 is also used to temporarily store various processing data that is generated. The video signal generated by the receiver microprocessor 134 is fed to a video processing module 134 where the signal is amplified and decoded into a form suitable for use by a video monitor 136 to redisplay the talking head 2.

If two-way teleconferencing is desired (i.e., audio and video signals are transmitted from each teleconferencing party), a transmitter and a receiver is located at each location involved in the teleconference.

Thus, while there have been shown and described and pointed out fundamental novel features of the invention as applied to preferred embodiments thereof, it will be understood that various omissions and substitutions and changes in the form and details of the methods described and of the devices illustrated, and in their operation, may be made by those skilled in the art without departing from the spirit of the invention. For example, it is expressly intended that all combinations of those method steps and/or elements which perform substantially the same function in substantially the same way to achieve the same results are within the scope of the invention. Substitutions of method steps or elements from one described embodiment to another are also fully intended and contemplated. It is also to be understood that the drawings are merely conceptual in nature. It is the intention, therefore, to be limited only as indicated by the scope of the claims appended hereto.

For example, although one particular simplified Cost Function is disclosed, other more complex cost functions may alternatively be used that take into account other or additional desired data transmission factors. Although FIG. 3C discloses that it is first determined whether the difference value (corresponding to the magnitude of the difference between the actual lip picture and the predicted lip picture) exceeds a lower threshold value, step 71, and then whether it exceeds a higher threshold value, step 81, these steps could be reversed. In this embodiment, it is first determined whether the difference value exceeds a higher threshold value and then whether it exceeds a lower threshold value. If this embodiment is employed, the method steps associated with each determination would also have to be appropriately shifted.

Furthermore, although the present invention has been described with reference to transmitting the image of human lips of a talking head so that the lip image is synchronized with the sounds enunciated by the lips, the present invention may also be employed in cross-modal coding of other objects where synchronization of audio and visual signals is desired. The only requirement for an appropriate object is an ability to predict an image based upon the sound detected.

What is claimed is:

1. A method for remotely presenting a video output synchronized with an audio output, comprising:
   obtaining an actual video signal at a transmitter;
   obtaining an audio signal at the transmitter synchronized to the obtained actual video signal;
   processing at the transmitter the obtained audio signal to generate a predicted video signal corresponding to the obtained audio signal;
   comparing at the transmitter the predicted video signal to at least a portion of the obtained actual video signal to determine differences therebetween;
   selecting, based upon predetermined criteria, a selected signal comprising one of (a) the obtained audio signal and the obtained actual video signal, (b) the obtained audio signal and a difference video signal representative of the differences between the obtained actual video signal and the predicted video signal, and (c) the obtained audio signal;
   transmitting from the transmitter to a receiver the selected signal;
   generating the video output and the audio output by processing at the receiver the selected signal, the video output being synchronized with the audio output.

2. The method of claim 1, wherein the predetermined criteria comprise an information transmission rate from the transmitter to the receiver of the selected signal.

3. The method of claim 1, wherein the predetermined criteria comprise distortion between a video image generated from the actual video signal and the video output.

4. The method of claim 3, wherein the predetermined criteria further comprise an information transmission rate from the transmitter to the receiver of the selected signal.

5. The method of claim 4, wherein the predetermined criteria is a cost function defined as $C=R+(w \times D)$, where R is the information transmission rate, D is the distortion, and w is a weighting factor.

6. The method of claim 5, wherein the signal selected in said selecting step is selected so as to result in the lowest value for the cost function.

7. The method of claim 1, wherein the actual video signal obtained in said obtaining step comprises lips of a person, and the portion of the obtained actual video signal compared in said comparing step comprises the lips of the person.

8. The method of claim 1, wherein said processing step at the transmitter comprises separating the obtained audio signal into phonemes.

9. The method of claim 8, wherein said generating step at the receiver comprises separating the obtained audio signal into phonemes.

10. The method of claim 8, wherein said processing step at the transmitter further comprises generating a shape of lips corresponding to the phonemes.

11. The method of claim 9, wherein said generating step at the receiver further comprises generating a shape of lips corresponding to the phonemes.

12. The method of claim 10, wherein said generating step at the receiver further comprises generating a shape of lips corresponding to the phonemes.

13. The method of claim 1, wherein the predetermined criteria comprise the magnitude of differences between the actual video signal and the predicted video signal.

14. The method of claim 13, wherein (a) the obtained audio signal and the obtained actual video signal is selected in said selecting step if the magnitude of differences is not less than a first predetermined threshold value, (b) the obtained audio signal and the difference video signal is selected in said selecting step if the magnitude of differences is less than the first predetermined threshold value and not less than a second predetermined threshold value, and (c) the obtained audio signal is selected in said selecting step if the magnitude of the differences is less than the second predetermined threshold value.

15. A method for selecting a transmission signal for use in remotely presenting a video output synchronized with an audio output, the video and audio outputs being generated from the transmission signal, comprising:
   obtaining an actual video signal;
   obtaining an audio signal synchronized to the obtained actual video signal;
   processing the obtained audio signal to generate a predicted video signal corresponding to the obtained audio signal;
   comparing the predicted video signal to at least a portion of the obtained actual video signal to determine differences therebetween;
   selecting, based upon predetermined criteria, a selected signal to comprise the transmission signal, the selected signal comprising one of (a) the obtained audio signal and the obtained actual video signal, (b) the obtained audio signal and a difference video signal representative of the differences between the obtained actual video signal and the predicted video signal, and (c) the obtained audio signal.

16. The method of claim 15, wherein the predetermined criteria comprise an information transmission rate of the transmission signal.

17. The method of claim 15, wherein the predetermined criteria comprise distortion between a video image generated from the actual video signal and the video output generated from the transmission signal.

18. The method of claim 17, wherein the predetermined criteria further comprise an information transmission rate of the transmission signal.

19. The method of claim 18, wherein the predetermined criteria is a cost function defined as C=R+(w×D), where R is the information transmission rate, D is the distortion, and w is a weighting factor.

20. The method of claim 19, wherein the signal selected in said selecting step is selected so as to result in the lowest value for the cost function.

21. The method of claim 15, wherein the actual video signal obtained in said obtaining step comprises lips of a person, and the portion of the obtained actual video signal compared in said comparing step comprises the lips of the person.

22. The method of claim 15, wherein said processing step comprises separating the obtained audio signal into phonemes.

23. The method of claim 22, wherein said processing step further comprises generating a shape of lips corresponding to the phonemes.

24. The method of claim 15, wherein the predetermined criteria comprise the magnitude of differences between the actual video signal and the predicted video signal.

25. The method of claim 24, wherein (a) the obtained audio signal and the obtained actual video signal is selected in said selecting step if the magnitude of differences is not less than a first predetermined threshold value, (b) the obtained audio signal and the difference video signal is selected in said selecting step if the magnitude of differences is less than the first predetermined threshold value and not less than a second predetermined threshold value, and (c) the obtained audio signal is selected in said selecting step if the magnitude of the differences is less than the second predetermined threshold value.

26. An apparatus for selecting a transmission signal for use in remotely presenting a video output synchronized with an audio output, the video and audio outputs being generated from the transmission signal, comprising:

means for obtaining an actual video signal;

means for obtaining an audio signal synchronized to the obtained actual video signal;

means for processing the obtained audio signal to generate a predicted video signal corresponding to the obtained audio signal;

means for comparing the predicted video signal to at least a portion of the obtained actual video signal to determine differences therebetween;

means for selecting, based upon predetermined criteria, a selected signal to comprise the transmission signal, the selected signal comprising one of (a) the obtained audio signal and the obtained actual video signal, (b) the obtained audio signal and a difference video signal representative of the differences between the obtained actual video signal and the predicted video signal, and (c) the obtained audio signal.

27. The apparatus of claim 26, wherein the predetermined criteria comprise an information transmission rate of the transmission signal.

28. The apparatus of claim 26, wherein the predetermined criteria comprise distortion between a video image generated from the actual video signal and the video output generated from the transmission signal.

29. The apparatus of claim 28, wherein the predetermined criteria further comprise an information transmission rate of the transmission signal.

30. The apparatus of claim 29, wherein the predetermined criteria is a cost function defined as C=R+(w×D), where R is the information transmission rate, D is the distortion, and w is a weighting factor.

31. The apparatus of claim 30, wherein the signal selected by said selecting means is selected so as to result in the lowest value for the cost function.

32. The apparatus of claim 26, wherein the actual video signal obtained by said obtaining means comprises lips of a person, and the portion of the obtained actual video signal compared in said comparing means comprises the lips of the person.

33. The apparatus of claim 26, wherein said processing means separates the obtained audio signal into phonemes.

34. The apparatus of claim 33, wherein said processing means generates a shape of lips corresponding to the phonemes.

35. The apparatus of claim 26, wherein the predetermined criteria comprise the magnitude of differences between the actual video signal and the predicted video signal.

36. The apparatus of claim 35, wherein (a) the obtained audio signal and the obtained actual video signal is selected by said selecting means if the magnitude of differences is not less than a first predetermined threshold value, (b) the obtained audio signal and the difference video signal is selected by said selecting means if the magnitude of differences is less than the first predetermined threshold value and not less than a second predetermined threshold value, and (c) the obtained audio signal is selected by said selecting means if the magnitude of the differences is less than the second predetermined threshold value.

37. The apparatus of claim 26, further comprising a receiving means for receiving the transmission signal and for generating and presenting the video output synchronized with the audio output in response to the transmission signal received by said receiving means.

* * * * *